United States Patent [19]

Harbeke

[11] Patent Number: 4,823,527
[45] Date of Patent: Apr. 25, 1989

[54] PLUMBING CONCRETE FORM ACCESSORY

[76] Inventor: Gerold J. Harbeke, 2807 S. Military Trail, West Palm Beach, Fla. 33415

[21] Appl. No.: 91,692

[22] Filed: Sep. 1, 1987

Related U.S. Application Data

[63] Continuation-in-part of Ser. No. 807,927, Dec. 12, 1985, abandoned.

[51] Int. Cl.⁴ .............................................. E04G 15/06
[52] U.S. Cl. ........................................ 52/221; 52/699; 249/39; 249/91; 249/177; 249/207; 285/64
[58] Field of Search ............... 249/35, 39, 43, 83, 249/91, 93, 94, 96, 177, 186, 207, 145, 147, 149, 176, 144, 184, 219 R, 90; 52/220, 221, 576, 577, 699, 701, 232; 285/64, 56

[56] References Cited

U.S. PATENT DOCUMENTS

| | | | |
|---|---|---|---|
| 2,202,147 | 5/1940 | Gerriets | 72/0.5 |
| 2,728,126 | 12/1955 | Whitlock | 249/177 |
| 2,889,602 | 6/1959 | Maniaci | 248/68.1 |
| 2,963,826 | 12/1960 | Snider et al. | 52/221 |
| 2,968,855 | 1/1961 | Stolz | 249/177 |
| 3,037,326 | 6/1962 | Holloway | 52/577 |
| 3,048,911 | 8/1962 | Almon | 249/177 |
| 3,313,515 | 4/1967 | Mullen, Jr. | 249/145 |
| 3,421,551 | 1/1969 | Currier | 138/178 |
| 3,800,486 | 4/1974 | Harvey | 52/98 |
| 3,929,944 | 12/1975 | Oliver | 264/35 |
| 4,061,322 | 12/1977 | Le Blanc | 249/219 R |
| 4,159,099 | 6/1979 | Maguire | 249/93 |
| 4,261,598 | 4/1981 | Cornwall | 285/56 |
| 4,406,439 | 9/1983 | Garter | 249/DIG. 3 |
| 4,427,173 | 1/1984 | MacKay | 249/39 |

FOREIGN PATENT DOCUMENTS

| | | | |
|---|---|---|---|
| 995880 | 8/1976 | Canada | 249/91 |
| 2256991 | 5/1974 | Fed. Rep. of Germany | 249/39 |
| 227054 | 7/1969 | Sweden | 52/577 |

*Primary Examiner*—Jay H. Woo
*Assistant Examiner*—James C. Housel
*Attorney, Agent, or Firm*—Griffin, Branigan & Butler

[57] ABSTRACT

A plumbing concrete form accessory (10) includes a relatively large hollow displacement member (12) having a hole (18) in a wall thereof and defining a sleeve (19) about the hole for snugly fitting the outside surface of a pipe (48). A dissolving type adhesive is used to adhere the sleeve adjacent a first end (50) of the pipe and a second end (52) of the pipe is mounted to a concrete form (58) by means of a slidable flange (54) which is also adhered to the outside surface of the pipe. A spacer cuff (60) is mounted snugly about the outside surface of the pipe adjacent the second end thereof. The thusly mounted pipe supports the hollow displacement member in the concrete form while concrete (22) is poured about the pipe and the displacement member. In a preferred embodiment, a cover (14) is used to cover an open side (16) of the displacement member to allow selective access to the interior of the displacement member for coupling a fixture (36) to the first end of the pipe once the concrete has hardened.

12 Claims, 3 Drawing Sheets

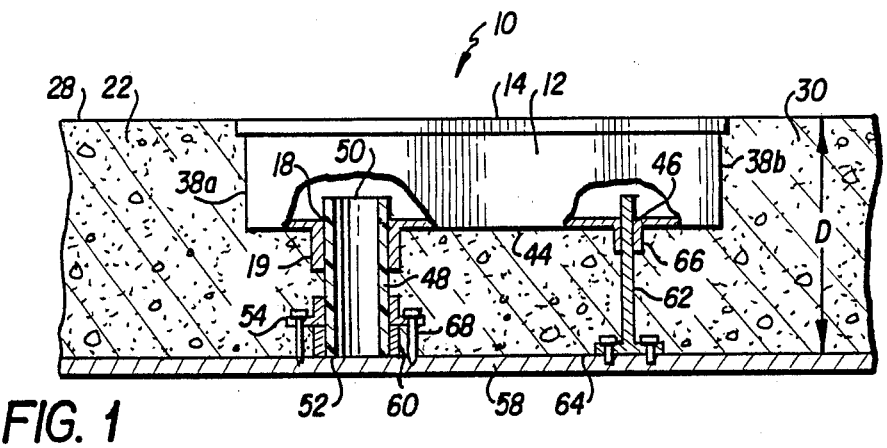
FIG. 1
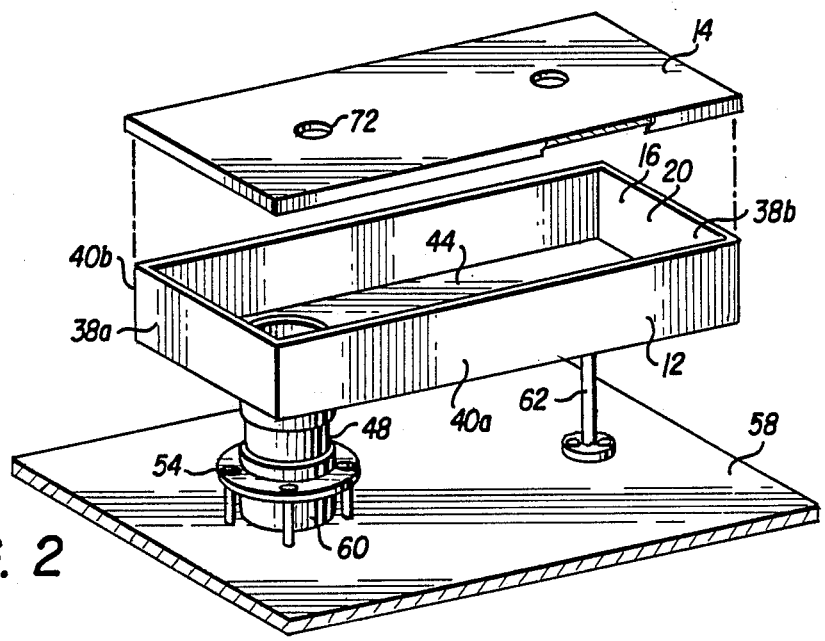
FIG. 2
FIG. 4
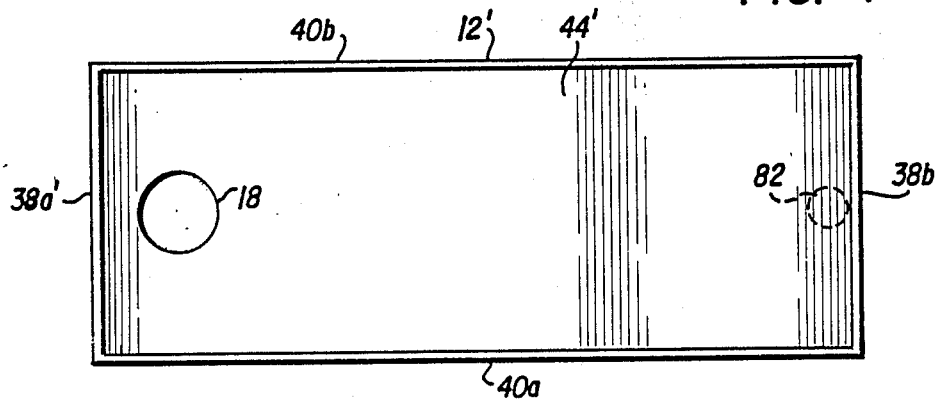

PLUMBING CONCRETE FORM ACCESSORY

BACKGROUND OF THE INVENTION

This is a continuation-in-part application of U.S. application Ser. No. 807,927, filed Dec. 12, 1985 now abandoned.

This invention relates broadly to the art of forming concrete barriers, especially floors, for accommodating plumbing systems. More particularly, this invention concerns an assembly which both prepares voids at upper surfaces of concrete barriers for accommodating later-installed plumbing fixtures and also which provides pipe coupling members to be embedded in the barrier walls for coupling with such fixtures. This invention is particularly useful in preparing concrete floors, during the pouring thereof, for use with tubs to be installed later.

Until relatively recently, pipe networks were normally extended through floors of buildings by forming holes in floors—e.g. by using void-forming devices during the "pouring" of floors, by knocking out holes, and by boring such holes after the floors had been formed, etc.—and thereafter extending pipes through these holes. Normally, the holes were made to be bigger than the pipes to ensure that one could put pipes easily through the holes. Thereafter it was necessary for workmen to fill the spaces between the pipes and the holes with cement or some other substance in order to meet fire codes which generally do not allow floor holes.

Similarly, in the past, plumbing fixtures which have been used to attach floor drains for tubs and the like to piping networks were accommodated by knocking out holes in cement, boring such holes after the floors have been formed, placing the plumbing fixtures outside of the concrete barriers, etc. All of these methods are not only difficult and time consuming to accomplish but create problems in that they cause undue repairing of the barrier once the fixtures are in place and/or require unusually-shaped plumbing fixtures to fit into small spaces. It is an object of this invention to provide a plumbing concrete form assembly which can be used for simultaneously creating a void near the upper surface of a floor barrier for accommodating plumbing fixtures in the barrier and for embedding a liquid-conveying pipe member in the concrete barrier for communicating with such fixtures placed in the void. It is also an object of this invention to provide the benefits mentioned in the previous sentence without creating unnecessary voids requiring an undue amount of work creating them and/or filling them after the barrier has hardened. It is also an object of this invention to provide such benefits without creating large pass-through holes in barriers which do not meet fire codes.

Still a further purpose of the invention is to provide the benefits set forth above while also allowing the use of normal pipe fixtures which are not unusually shaped or molded.

It is yet another object of this invention to provide such a plumbing concrete form assembly which is inexpensive to manufacture and easy and convenient to use

SUMMARY

According to principles of this invention, a hollow displacement member with one open side has a hole therein with a sleeve at the hole for adhering to a first end of a pipe whose second end is mounted on a concrete form wall. Thus, the hollow displacement member is supported by in the concrete form, along with the pipe, while concrete is poured therein. In one embodiment, the first end of the pipe passes through the hole in the displacement member while a second end of the pipe is mounted to the concrete form wall by means of a slidable flange which is adhered to the surface of the pipe. A frangible spacer cuff is placed snugly about the second end of the pipe between the flange and the form to create a space for a female coupler. The open side of the hollow displacement member has a cover which engages the displacement member when concrete is poured but which is removed after the concrete hardens for allowing the coupling of plumbing fittings to the firstend of the pipe inside the hollow displacement member. The spacer cuff is removed from the second end of the pipe once the concrete form is removed for attaching a female plumbing fitting to the second end of the pipe.

BRIEF DESCRIPTION OF THE DRAWING

The foregoing and other objects, features and advantages of the invention will be apparent form the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

FIG. 1 is a side, partially sectional, view of a plumbing concrete form accessory of this invention shown mounted on a liquid-conveying pipe which is, in turn, mounted on a concrete form wall with poured concrete thereabout;

FIG. 2 is an isometric, partially-exploded, view of the items shown in FIG. 1 but from above the form and with no concrete therein;

FIG. 4 is a top view of a second embodiment of a plumbing concrete form accessory of this invention with a cover thereof removed;

DESCRIPTION OF THE PREFERRED EMBODIMENT

Figure 3:
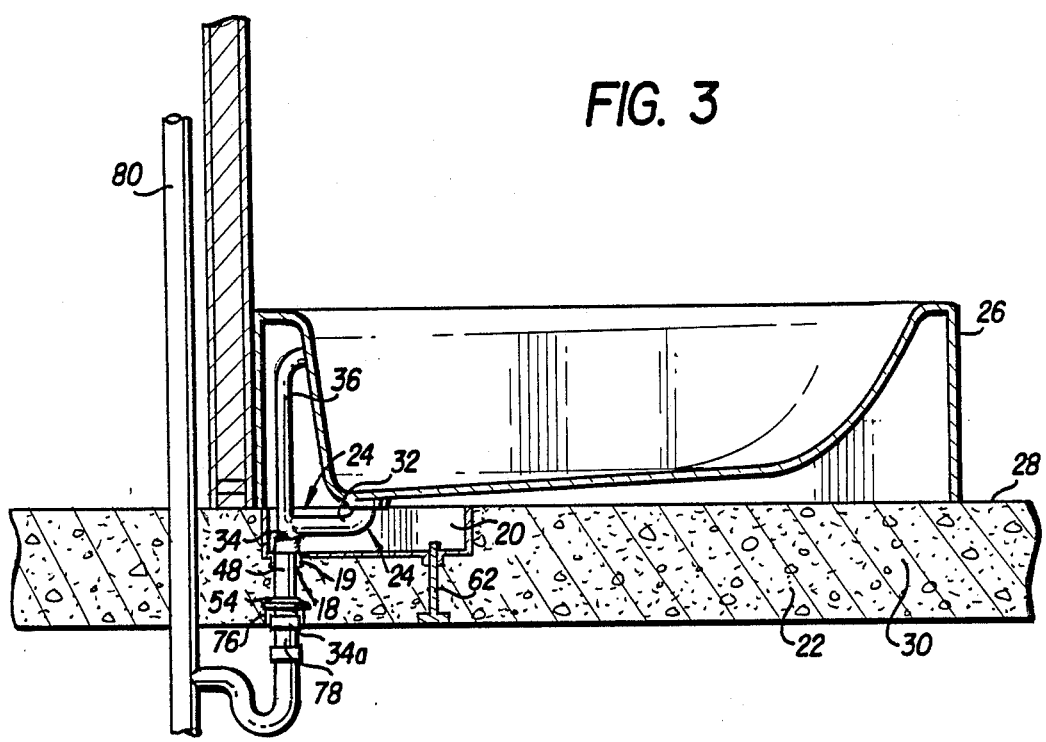
FIG. 3 is a partially sectional side view of a portion of a plumbing network mounted in a working void created by the form accessory of FIGS. 1 and 2 for servicing drains to a bathtub.

A plumbing concrete form accessory 10 includes a box-like large hollow displacement member 12 and a cover 14 for an open side 16. The large displacement member 12, in addition to having the open side 16, defines a hole 18 surrounded by a sleeve 19. The displacement member 12 defines a working void 20 in concrete 22 which accommodates plumbing fittings 24 to be used to service a plumbing element, such as bathtub 26 as shown in FIG. 3, mounted on a surface 28 of a building floor barrier 30. In this respect, in order to service a drain pipe fitting 32, a pipe coupling 34 and an overflow drain fitting 36, the large displacement member 12 is made to have dimensions of at least two and a half inches high, six and three quarter inches wide, and twelve inches long, although other dimensions are also used. In this respect, in the depicted embodiment, the displacement member 12 is rectangular in shape having end walls 38a and 38b, side walls 40a and 40b and a bottom wall 44. When the cover 14 is covering the open side 16 of the large displacement member 12, it is a substantially closed enclosure with the exception of the pipe hole 18 in the bottom wall 44 and an additional support hole 46. The large displacement member 12 and the cover 14 can be constructed of aluminum, plastic, and the like, however, in the preferred embodiment, it is constructed of the same type of plastic of which plastic pipes are made such as polyvinyl chloride polymer (PVC) or acrylonitrile-butadiene-styrene polymers (ABS).

The displacement member 12 is supported by a pipe stub 48 of standard plastic pipe which passes snugly through the sleeve 19 so that a first end 50 thereof is positioned inside the working void 20. A second end 52 of the pipe stub 48 is surrounded by and attached to a slidable flange 54 which is nailed or screwed to a concrete form wall 58. A frangible spacer cuff 60 is mounted between the slidable flange 54 and the concrete form wall 58. Details of the slidable flange 54 and the spacer cuff 60 are set forth in U.S. patent application Ser. No. 881,547, filed on July 2, 1986, of Gerold J. Harbeke and, it is not thought necessary to further describe these items here. Both the sleeve 19 and the slidable flange 54 are adhered to the outer surface of the pipe stub 48 by means of a normal, plastic-pipe, adhesive, or solvent, weld which is well known in the art. In this respect, the slidable flange 54 is also made of a plastic of which standard plastic pipe is constructed.

An additional plastic support 62, having a flange 64 at a lower end thereof fits snugly through the additional hole 46 and an additional sleeve 66 as is depicted in FIG. 1.

In operation of the device shown in FIGS. 1 and 2, the pipe stub 48 is cut from a standard plastic pipe to be of a length slightly longer than the distance between the top surface of the concrete form wall 58 and the bottom wall 44 of the displacement member 12 when the cover 14 is positioned at the surface 28 of the barrier 30 to be cast. The pipe stub 48 is placed on the form wall 58 at a place where a liquid bearing pipe is to pass through the concrete barrier 22. The spacer cuff 60 is slid thereon until it also abuts the concrete form wall 58 and the slidable flange 54 is slid on the outer surface of the pipe stub 48 until it rests on top of the cuff 60. The slidable flange 54 is adhered to the outer surface of the pipe stub 48 at this location with a plastic-pipe adhesive and nails or screws 68 are passed therethrough to hold the flange 54 to the concrete form wall 58. The additional support 62 is then inserted up through the additional sleeve 66 and the additional hole 46 and the displacement member 12 is manipulated so that its sleeve 19 and the hole 18 slide down the installed pipe stub 48. The position of the additional support 62 is then marked, the displacement member 12 removed, and the flange 64 of the additional support 62 is fastened to the concrete form wall 58.

Thereafter, the displacement member 12 is placed on the both the pipe stub 48 and the additional support member 62 with these elements respectively passing through the hole 18 and the additional hole 46. The displacement member 12 is then moved vertically to a position such that, when the cover 14 is thereof, a top surface of the cover is at a top surface 70 to which concrete 22 is to be poured. The sleeve 19 and the additional sleeve 66 are then respectively adhered to the outer surfaces of the pipe stub 48 and the additional support 62. The cover 14 is placed on the displacement member 12 and the concrete 22 is poured. Once the concrete 22 has cured, the cover 14 is removed using gripping holes 72 therein, the concrete form wall 58 is removed, and the Frangible spacer cuff 60 is removed. Thereafter, as is depicted in FIG. 3, a pipe coupling 34 is placed on a first end 50 of the pipe stub 48 whose first end is inside the working void 20. The drain pipes 36 and 32 from a tub 26 are coupled to the pipe coupling 34. In this respect, the pipe coupling 34 is a normal pipe coupling having a small internal shoulder in the middle thereof against which the pipe stub 48 and the drain pipe 36 abut. Such a pipe coupling 34 is shown in more detail with another embodiment of the invention in FIG. 5. The coupling 3 is adhered to both the drain pipe 36 and the pipe stub 48. A second coupling 34a is attached to the second end 52 of the pipe stub 48 in a void 76 left by removing the frangible spacer cuff 60. A further pipe 78 is attached to the second coupling 34a to be attached to a building drain stack 80. The slidable flange 54 is left embedded in the concrete 22 to prevent the pipe stub 48 from falling out of the concrete 22 after the form wall 58 is removed. The additional support 62 is left in position to prevent the spreading of a fire through a hole which would be left if the additional support 62 were removed.

Figure 5:
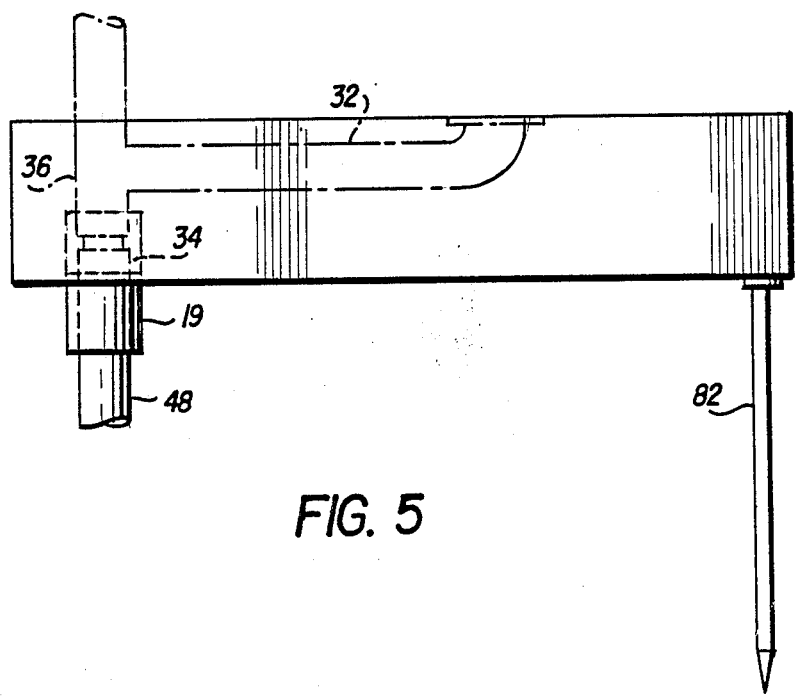
FIG. 5 is a side view of the plumbing concrete form accessory of FIG. 4 with a cast-in pipe being shown therein as well as other coupling pipes being shown therein in phantom to be mounted after the concrete hardens.

Looking now at the FIGS. 4 and 5 embodiment, this concrete-form accessory 84 is mainly for use on the bottom story of a building in which concrete is poured on ground. In this embodiment, an additional support 82 is in the form of a pointed spike which can be embedded in the ground. The pipe stub 48 can actually be part of a longer pipe which is also embedded in the ground or mounted on the ground in some way. Otherwise, the plumbing concrete form accessory 84 functions in basically the same manner as does the plumbing concrete form accessory 10.

Figure 6:
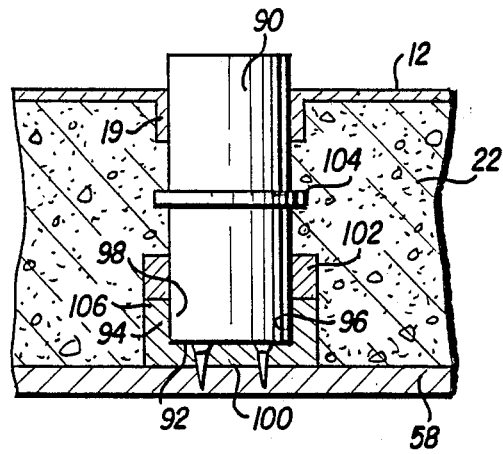
FIG. 6 is a partially-sectional view of an embodiment of this invention in which a cast-in pipe with an intumescent cuff thereon is shown supported by a female cup-type attachment device mounted on a form; with concrete thereabout.
Figure 7:
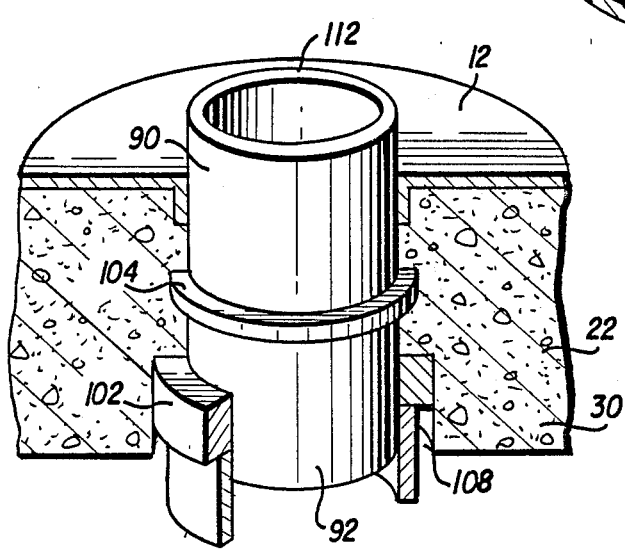
FIG. 7 is an isometric, partially-sectional, view of the embodiment of FIG. 6 after the concrete has cured, the form has been pulled away, and a pipe coupling has been attached to a lower end of the cast-in pipe.

Turning now to the embodiment of FIGS. 6 and 7, in this embodiment the large displacement member 12 is shown attached to a pipe stub 90 cut from standard plastic pipe. This embodiment differs from that of the FIGS. 1 and 2 embodiment in that a lower end 92 of the pipe stub 90 is mounted on the concrete form wall 58 by means of a female cup-type attachment device 94. The cup-type attachment device 94 is circular in shape and has a circular cavity 96 into which the lower end 92 of the pipe stub 90 is forced fitted from an open end 98 thereof. A bottom wall 100 of the cup-type attachment device 94 is screwed, nailed, welded, or held by some other means, to the concrete form wall 58. In this embodiment, an intumescent cuff 102 is shown about the pipe stub 90 above the female cup-type attachment device 94. Also, a separate riser ring 104 is shown mounted on the outer surface of the pipe stub 90.

In use of the FIGS. 6 and 7 embodiment, the female cup-type attachment device 94 is attached to the concrete form wall 58 at a location on the form wall 58 at which a drain pipe for a bathtub is to be placed. Thereafter, the pipe stub 90 of an appropriate length is cut from standard pipe and the intumescent cuff 102 is placed on the pipe stub 90. Similarly, the separate riser ring 104 is placed on the pipe stub 90 and is glued thereto. Before the concrete 22 is poured into the form 58 this pipe stub 90 is forced down into the female cup-type attachment device 94 where it is tightly held by friction. Thereafter, the large displacement member 12 is slid onto the pipe stub 90 to be spaced an appropriate distance from the concrete wall form wall 58 and its sleeve 19 is glued thereto. Of course an additional support 62 of the type shown in the FIGS. 1 and 2 embodiment are also included, however, they cannot be seen in FIGS. 6 and 7. Thus, the large displacement member 12 is supported by the pipe stub 90 which is positively supported by the female cup-type attachment device 94. At this point, concrete 22 is poured into the form 58 and allowed to cure. Once the concrete has cured, the form 58 is removed and with it the female cup-type attachment device 94 is also removed. In this regard, it should be noted that a wall 106 of the female cup-type attachment device 94 is quite thick, and, in fact, is about as thick as the intumescent cuff 102. When the cup-type attachment device 94 is removed, a coupling cavity 108 (FIG. 7) is left which allows a normal female/female pipe coupling 110 to be attached to the lower end in 92 of the pipe stub 90. Also, the coupling cavity 108 leaves room which allows heat from any fire taking place below a floor barrier 30 to rise therein and come into contact with the intumescent cuff 102, thereby causing the intumescent cuff 102 to expand, closing off the pipe stub 90 and preventing the fire from spreading to above the floor barrier 30 through a bore of the pipe stub 90. The separate riser ring 104, which is glued to the outer surface of the pipe stub 90, prevents the pipe stub 90 from falling out of the floor barrier 30 after the concrete 22 has cured and while attachments are being made to opposite ends of the pipe stub 90. A fitting is coupled to an upper end 112 of the pipe stub 90 extending up into the working cavity of the displacement member 12, in the same manner as in the FIGS. 1–3 embodiment.

Figure 8:
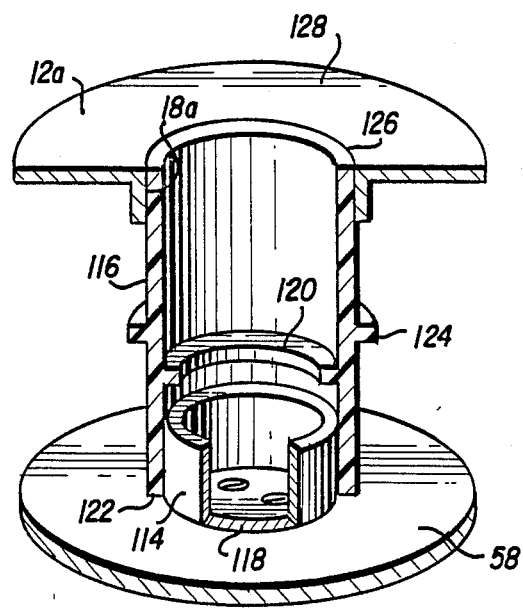
FIG. 8 is an isometric sectional view of another embodiment of this invention in which the cast-in pipe thereof is a special female/female coupler and is shown held on a form by means of a male cup-type attachment device.

The FIG. 8 embodiment is somewhat similar to the other embodiments, however, in this embodiment a male cup-type attachment device 114 has a special female/female pipe coupler 116 force fitted thereon. In this regard, the male cup-type attachment device 114 has the same outside diameter as a standard pipe to be passed through a floor barrier. As in the FIGS. 6 and 7 embodiment, the male cup-type attachment 114 device has a bottom wall 118 which is welded, screwed, nailed, or the like, to the form wall 58. The special pipe coupling 116 has a built in internal shoulder 120 positioned closer to a bottom end 122 and a built in external riser 124 which is also closer to the bottom end 122. In this respect, the special pipe coupling 116 is sold with a length dimension which is at least as long as the longest use to which it will be put. If when the special pipe coupling 116 is installed, it is determined that it should be shorter, a piece is cut from its top end 126, thereby not disturbing the internal shoulder 120 and the riser 124. In this embodiment, a large displacement member 12a is a little bit different than the large displacement members of the other embodiments describe herein in that a hole 18a is somewhat larger to accept the special pipe coupling 116 whose outer diameter is larger than that of a standard pipe.

In use, the male cup-type attachment device 114 is attached to a concrete form wall 58 at a location at which a plastic pipe drain pipe is to be passed through a floor barrier. Thereafter, it is determined for a particular floor barrier thickness the distance a large displacement member 12a should be positioned from the concrete form wall 58 and the special pipe coupling 116 is cut to the appropriate length so that its top end 126 is at or slightly above an internal surface 128 thereof. Thereafter, a bottom end 122 is forced onto the male cup-type attachment device 114 to which it is tightly held and the large displacement member 12a is slid thereon and adhered thereto. Concrete is then poured onto the concrete form wall 58 and allowed to cure. The concrete form 58 is then removed and with it the male cup-type attachment device 114. The built-in riser 124 prevents the special pipe coupling 116 from pulling out of the thusly cured concrete. Standard pipes are then inserted into the bottom and top ends 122 and 126 of the special pipe coupling 116 until they contact the internal shoulder 12, where they are glued. As in the embodiments of the other Figures, plumbing fittings are mounted to the top end 126 in a working void in the large displacement member 12a.

One benefit of the embodiments of FIGS. 6 and 7 and FIG. 8 is that the cup-type attachment devices 94 and 114 can be placed on the form wall 58 by workers other than plumbers. Also, these cup-type attachment devices can be left on the forms for future use when the forms are again used. In the FIG. 8 embodiment, it is also often desirable to place an intumescent cuff about the special pipe coupling 116 immediately adjacent the concrete form wall 58, although not shown in FIG. 8.

It will be appreciated by those skill in the art that the plumbing concrete form accessory of this invention enables a plumbing contractor not only to leave voids at specific areas located at upper surfaces of floor barriers, but also allows the plumbing contractor to simultaneously embed cast-in liquid-conveys pipes which are to be coupled to plumbing fixtures mounted in the voids. This invention allows one to achieve these highly beneficial results with an inexpensive device which can be easily manufactured and used. It should be understood that the device can only be used once, inasmuch as it is left in place and then the plumbing fixtures are mounted inside the displacement member 12. Further, when this device is used, very little further work is required to prepare a concrete floor for receiving plumbing fixtures and/or to make the floor fireproof.

While the invention has been particularly shown and described with reference to a preferred embodiment, it will be understood by those skilled in the art that various changes in form and detail may be made therein without departing from the spirit and scope of the invention. For example, in many embodiments of this invention no additional support 62 or 82 is required inasmuch as many large displacement members can be fully supported by a pipe stub which is itself supported by a wall of a concrete form. It is also possible to place an intumescent-material cuff about the pipe stub 48 above the spacer cuff 60 but below the slidable flange 54 so as to make the pipe stub 48 fireproof. In this regard, once the spacer cuff 60 is removed heat from a floor below the floor barrier can reach such an intumescent-material cuff, and expand it, thereby closing off the pipe stub 48. Such a structure is fully described in U.S. patent application Ser. No. 881,547, filed July 2, 1986, of Gerold J. Harbeke.

Further, any additional support 62 which is required could be constructed of a fireproof material so that it could not melt to create a passage through the floor barrier 30 in case of a fire. Also, it could be constructed of a very small pipe, too small to allow the passage of a flame. Further, the sleeve 19 need not be as long as it is depicted in the drawings, but rather could merely be the inside surface of the hole 18 which can be adhered to the outside surface of a pipe.

The embodiments of the invention in which an exclusive property or privilege are claimed are defined as follows:

1. A plumbing concrete form accessory to be mounted on a concrete form for molding a void at a surface of a concrete wall for installation of a plumbing fixture therein and for simultaneously providing a cast-in, liquid-conveying pipe stub for servicing said plumbing fixture, said form accessory comprising:

a hollow displacement member having a bottom wall, side walls, and an open top, said displacement member being of a size for forming a working void at said surface of said concrete wall in which said plumbing fixture can be easily coupled to said pipe stub, said hollow displacement member having a hole in said bottom wall thereof, said bottom wall defining an annularly-shaped sleeve at said hole for fitting an outside surface of said pipe stub relatively snugly, except for said hole said bottom wall and side walls of said displacement member being closed for displacing wet concrete poured into said concrete form and thereby forming said working void, but said top being open for providing access to the interior of said hollow displacement member through which said plumbing fixture can be coupled to said pipe stub once the concrete has cured;

said liquid-conveying pipe stub with a first end having an outer surface with a size and shape for snugly fitting into said sleeve and sliding therein and a second end for being attached to a concrete form;

first attachment means for attaching said sleeve to the outer surface of said pipe stub to thereby mount said hollow displacement member on said pipe stud while leaving access to said first end of said pipe stub from within the interior of said hollow displacement member whereby said plumbing fixture can be coupled to said pipe stub from within the interior of said hollow displacement member;

second attachment means for being attached to said form and to said second end of said pipe stub for thereby mounting said pipe stub and said hollow displacement member on said form; and an additional shaft support extending from said hollow displacement member to said form wall for providing additional support for said hollow displacement member;

whereby said hollow displacement member can be mounted on the exterior surface of the pipe stub and the pipe stub can be mounted on a concrete form so that this entire structure is thereby supported and held in position in said concrete form while concrete is poured and cured in said concrete form and thereafter left in position to have said plumbing fitting coupled to said first end of said pipe stub from the interior of said hollow displacement member and a further pipe attached to said second end of said pipe stub.

2. A plumbing concrete form accessory as in claim 1, wherein said liquid-conveying pipe stub is cut from a larger pipe.

3. A plumbing concrete form accessory as in claim 2, wherein said second attachment means is for attaching to said second end of said pipe stub by being force fitted to an inner surface of said second end of said pipe stub.

4. A plumbing concrete form accessory as in claim 3, wherein said plumbing concrete form accessory further includes an intumescent cuff surrounding the second end of said pipe stub which is attached to said concrete form wall.

5. A plumbing concrete form accessory as in claim 4, wherein said pipe stub and said hole are of such sizes that said pipe stub is slidable in said hole in said displacement member wall along said sleeve to enter said working void of said displacement member.

6. A plumbing concrete form accessory as in claim 5, wherein said first attachment means comprises an adhesive adhering said sleeve to the outer surface of said pipe stub once these members are in place in a concrete form.

7. A plumbing concrete form accessory as in claim 2, wherein said pipe stub and said hole are of such sizes that said pipe stub is slidable in said hole in said displacement member wall along said sleeve to enter said working void of said displacement member.

8. A plumbing concrete form accessory as in claim 7, wherein said first attachment means comprises an adhesive adhering said sleeve to the outer surface of said pipe stub once there members are in place in a concrete-form.

9. A plumbing concrete form accessory as in claim 1, wherein said pipe stub includes a pipe coupler.

10. A plumbing concrete form accessory as in claim 9, wherein said pipe coupler extends approximately from said concrete form to said hollow displacement member.

11. A plumbing concrete form accessory as in claim 1, wherein is further included an additional shaft support extending from said hollow displacement member to form for providing additional support for said hollow displacement member.

12. A plumbing concrete form accessory as in claim 1, wherein said hollow displacement member includes a removable cover removably covering at least said open top.

* * * * *